(12) United States Patent
Boch et al.

(10) Patent No.: US 7,957,291 B2
(45) Date of Patent: Jun. 7, 2011

(54) APPARATUS AND METHODS FOR CONTROLLING EFFECTIVE COMMUNICATION TRAFFIC RATES

(75) Inventors: Erik Boch, Ottawa (CA); Prakasha Aithal, Ottawa (CA)

(73) Assignee: Canada Inc., Ottawa, Ontario (CA)

( * ) Notice: Subject to any disclaimer, the term of this patent is extended or adjusted under 35 U.S.C. 154(b) by 512 days.

(21) Appl. No.: 11/783,091

(22) Filed: Apr. 5, 2007

(65) Prior Publication Data

US 2007/0237119 A1    Oct. 11, 2007

Related U.S. Application Data

(60) Provisional application No. 60/789,611, filed on Apr. 6, 2006.

(51) Int. Cl.
*G01R 31/08* (2006.01)
(52) U.S. Cl. .................................... 370/235.1
(58) Field of Classification Search .............. 715/734; 370/229, 230, 232
See application file for complete search history.

(56) References Cited

U.S. PATENT DOCUMENTS

| | | | |
|---|---|---|---|
| 5,710,757 A | 1/1998 | May | |
| 5,905,711 A * | 5/1999 | Chiussi et al. | 370/232 |
| 5,909,434 A | 6/1999 | Odenwalder et al. | |
| 6,028,868 A | 2/2000 | Yeung et al. | |
| 6,078,568 A | 6/2000 | Wright et al. | |
| 6,205,129 B1 * | 3/2001 | Esteves et al. | 370/331 |
| 6,314,084 B1 | 11/2001 | Kahale et al. | |
| 6,389,067 B1 | 5/2002 | Riddle et al. | |
| 6,408,005 B1 | 6/2002 | Fan et al. | |
| 6,438,134 B1 | 8/2002 | Chow et al. | |
| 6,463,274 B1 * | 10/2002 | Robertson | 455/406 |
| 6,480,911 B1 | 11/2002 | Lu | |
| 6,580,721 B1 | 6/2003 | Beshai | |
| 6,700,869 B1 | 3/2004 | Falco et al. | |
| 6,707,862 B1 | 3/2004 | Larsson | |
| 6,711,180 B1 | 3/2004 | Delesalle et al. | |
| 6,789,190 B1 | 9/2004 | Cohen | |
| 6,885,638 B2 | 4/2005 | Xu et al. | |
| 6,904,015 B1 | 6/2005 | Chen et al. | |
| 6,904,286 B1 | 6/2005 | Dantu | |
| 6,907,048 B1 | 6/2005 | Treadaway et al. | |
| 7,085,540 B2 * | 8/2006 | Cao et al. | 455/68 |
| 7,206,283 B2 * | 4/2007 | Chang et al. | 370/230 |
| 7,584,293 B1 * | 9/2009 | Graf et al. | 709/232 |
| 2003/0099221 A1 * | 5/2003 | Rhee | 370/338 |
| 2003/0189947 A1 * | 10/2003 | Beshai | 370/428 |
| 2005/0100045 A1 | 5/2005 | Hunkeler et al. | |
| 2005/0111361 A1 | 5/2005 | Hosein | |
| 2005/0175014 A1 | 8/2005 | Patrick | |
| 2005/0243757 A1 | 11/2005 | Yagyu et al. | |
| 2006/0215556 A1 * | 9/2006 | Wu et al. | 370/230 |

FOREIGN PATENT DOCUMENTS

| | | |
|---|---|---|
| EP | 1 575 224 A1 | 9/2005 |
| EP | 1 592 139 A2 | 11/2005 |
| WO | WO 2004/114716 A1 | 12/2004 |
| WO | WO 2005/055504 | 6/2005 |

* cited by examiner

*Primary Examiner* — Chi H Pham
*Assistant Examiner* — Fan Ng

(57) ABSTRACT

Apparatus and methods for controlling effective communication traffic rates are disclosed. Communication signals that include communication traffic are generated for transfer on a wireless communication link based on fixed signalling characteristics. An effective communication traffic rate of the wireless communication link is controlled by controlling a rate at which communication traffic is provided to a communication module, illustratively a wireless transceiver, that generates the communication signals. Techniques according to embodiments of the invention thereby enable rate control for wireless communication links without changing wireless signalling characteristics or subjecting links to downtime during link reconfiguration. Collaborative rate control, in which rate control information is exchanged between rate control systems, is also contemplated.

10 Claims, 4 Drawing Sheets

APPARATUS AND METHODS FOR CONTROLLING EFFECTIVE COMMUNICATION TRAFFIC RATES

CROSS-REFERENCE TO RELATED APPLICATION

This application claims the benefit of U.S. Provisional Patent Application Ser. No. 60/789,611, entitled "APPARATUS AND METHODS FOR CONTROLLING EFFECTIVE COMMUNICATION TRAFFIC RATES", and filed on Apr. 6, 2006, the entire contents of which are incorporated herein by reference.

FIELD OF THE INVENTION

This invention relates generally to wireless communications and, in particular, to controlling effective communication traffic rates on wireless communication links.

BACKGROUND

Communication networks such as Ethernet networks can be realized using meshed or ringed network architectures. The mesh/ring nodes often act as user traffic aggregation points. One of the most common requirements of these types of networks is the capability to limit the user data rate on either core network links or access links.

In conventional wired networks, rate limiting is typically done at switching/routing nodes. These nodes, however, tend to use relatively complex rate control mechanisms, and are expensive to implement.

Where wireless communication links are to be used to enable communications between switching/routing nodes in different networks, for example, rate limiting could potentially be applied on the wireless links. This can in some cases eliminate the need for the more complex and expensive switching/routing nodes.

One option for wireless node rate limiting would be to use similar techniques to those applied at nodes in wired communication networks. However, as noted above, these techniques tend to be complex and would therefore require more complicated and expensive equipment at each wireless communication node.

Another type of rate limiting technique that could be used for wireless communication links involves changing radio interface characteristics, such as coding and/or modulation schemes. These techniques can be undesirable in that they disrupt user traffic and may be contrary to communication regulations or standards. Changing the over-air characteristics of a wireless transmission might affect regulatory requirements, for example, in that a licensed link may not be allowed to change modulation states or the states may not be among those that are allowed by a regulatory body. In addition, link availability might also change due to changes in radio system gain caused by a change in modulation state and/or over-air bandwidth.

SUMMARY OF THE INVENTION

There remains a need for improved communication rate control techniques.

Embodiments of the present invention provide a mechanism for controlling, and even changing, effective data rates on wireless communication links without changing actual communication signal characteristics.

For a wireless communication link, a change in throughput using the techniques disclosed herein might not require changes in configurations at the radio layer. This avoids some of the problems noted above, and does not subject the link to any downtime when a rate change is to be made.

According to one aspect of the invention, there is provided an apparatus that includes a communication module and a rate control system. The communication module is operable to receive communication traffic, and to generate, based on fixed signalling characteristics, communication signals comprising the communication traffic for output to a wireless communication link. The rate control system is operatively coupled to the communication module, and is operable to output a communication traffic stream to the communication module and to control an effective communication traffic rate of the wireless communication link by controlling a rate of the communication traffic stream.

The rate control system may be configurable using communication traffic rate control information, and may be operable to exchange communication traffic rate control information with a further apparatus that is operatively coupled to the wireless communication link. If the communication module enables exchange of communication rate control information with the wireless communication link, the rate control system may exchange communication traffic rate control information with the further apparatus through the communication module and the wireless communication link.

In some embodiments, the rate control system includes a communication traffic sorter operable to determine to which traffic group of a plurality of traffic groups received communication traffic belongs, a communication traffic transfer module, operatively coupled to the communication traffic sorter, and operable to combine the received communication traffic into a communication traffic stream in accordance with a transfer scheme that is based on the plurality of traffic groups, and a rate controller, operatively coupled to the communication traffic transfer module, and operable to control a rate of the communication traffic stream by controlling the transfer scheme.

The rate control system may also include a plurality of traffic queues operatively coupled between the communication traffic sorter and the communication traffic transfer module. Each traffic queue of the plurality of traffic queues is for storing communication traffic of a respective traffic group of the plurality of communication traffic groups. The communication traffic sorter may then store received communication traffic determined to belong to a traffic group of the plurality of traffic groups to the queue for the determined traffic group.

The transfer scheme applied by the communication traffic transfer module may specify respective transfer rates at which communication traffic of the plurality of traffic groups may be combined into the communication traffic stream. The respective transfer rates may include a committed transfer rate at which received communication traffic of a traffic group is to be combined into the communication traffic stream, a maximum transfer rate up to which received communication traffic of a traffic group is to be combined into the communication traffic stream, or both a committed transfer rate and a maximum transfer rate.

The rate controller may be operable to control the transfer scheme to cause the communication traffic transfer module to reduce a rate at which communication traffic is combined into the communication traffic stream when an input rate at which the communication traffic stream is received by the rate controller exceeds a target effective communication traffic rate.

In some embodiments, the rate control system is implemented in software for execution by a processing element.

A method according to another aspect of the invention includes receiving a communication traffic stream comprising communication traffic, generating communication signals, based on fixed signalling characteristics, for output to a wireless communication link, the communication signals comprising the communication traffic, and controlling an effective communication traffic rate of the wireless communication link by controlling a rate of the communication traffic stream.

The method may also include receiving communication traffic rate control information, and controlling a rate of the communication traffic stream based on the received communication traffic rate control information.

In some embodiments, the method includes sorting communication traffic into a plurality of traffic groups, and combining the sorted communication traffic into the communication traffic stream in accordance with a transfer scheme that is based on the plurality of traffic groups. Controlling may then involve controlling a rate of the communication traffic stream by controlling respective transfer rates at which communication traffic of the plurality of traffic groups may be combined into the communication traffic stream.

When a current rate of the communication traffic stream exceeds a target effective communication traffic rate, controlling involves reducing a rate of the communication traffic stream.

The method may be embodied, for example, as instructions stored on a machine-readable medium.

Another aspect of the invention provides an apparatus that includes an interface and a communication traffic rate control system. The interface enables communication traffic rate control information to be exchanged with a remote apparatus that is operatively coupled to a wireless communication link. The communication traffic rate control system is operatively coupled to the interface, and is operable to exchange communication traffic rate control information with the remote apparatus through the interface and to control an effective communication traffic rate of the wireless communication link by controlling, based on the exchanged communication traffic rate control information, an amount of communication traffic transferred over the wireless communication link in communication signals that are generated using fixed signalling characteristics.

The communication traffic rate control system may exchange communication traffic rate control information with the remote apparatus by transmitting the communication traffic rate control information to the remote apparatus through the interface or by receiving the communication traffic rate control information from the remote apparatus through the interface. In some embodiments, the communication traffic rate control system is operable to exchange communication traffic rate control information with the remote apparatus by transmitting communication traffic rate control information to the remote apparatus and receiving communication traffic rate control information from the remote apparatus through the interface, to thereby negotiate communication traffic rate control information based upon which the amount of communication traffic transferred over the wireless communication link is controlled.

The apparatus may be implemented, for example, in each of a pair of communication network elements of a communication system. The communication traffic rate control systems at the network elements exchange communication traffic rate control information and establish the same effective communication traffic rate for communication signals to be transferred in opposite directions on the wireless communication link.

A method, according to yet another aspect of the invention, includes exchanging communication traffic rate control information between a communication traffic rate control system and a remote communication traffic rate control system that are operatively coupled to a wireless communication link, and controlling an effective communication traffic rate of the wireless communication link by controlling, based on the communication traffic rate control information, an amount of communication traffic transferred over the wireless communication link in communication signals that are generated using fixed signalling characteristics.

Exchanging may involve at least one of: transmitting the communication traffic rate control information to the remote communication traffic rate control system, and receiving the communication traffic rate control information from the remote communication traffic rate control system.

In some embodiments, exchanging involves negotiating communication traffic control information based upon which the amount of communication traffic transferred over the wireless communication link is controlled, by transmitting communication traffic rate control information to the remote communication traffic rate control system and receiving communication traffic rate control information from the remote communication traffic rate control system.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
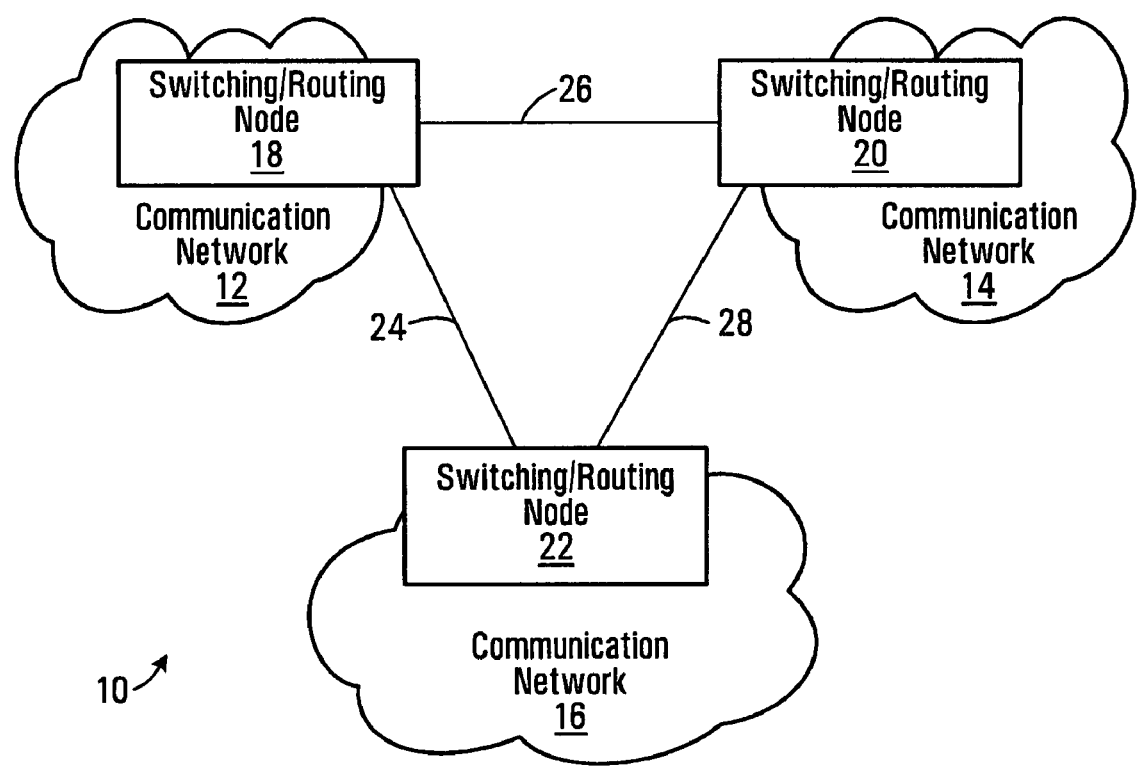
FIG. 1 is a block diagram of a communication system.

FIG. 1 is a block diagram of a communication system 10, which includes communication networks 12, 14, 16. Switching/routing nodes 18, 20, 22 that are at least coupled to or, as shown, form part of the communication networks 12, 14, 16 enable communications between the communication networks through wired communication links 24, 26, 28. Although the communication networks 12, 14, 16 may include many nodes, only one node per network is shown in FIG. 1 to avoid overly complicating the drawing.

Those skilled in the art will be familiar with various communication systems having a general structure similar to that of the system 10, the types of communication equipment such as the switching/routing nodes 18, 20, 22 provided in such systems, and the operation thereof. The system 10 might be a simple Ethernet wired mesh/ring network with the three switching/routing nodes 18, 20, 22 interconnecting different user networks 12, 14, 16, for instance. As the present invention relates primarily to controlling communication rates and is not specific to any particular type of communication system, network, or link, communication system operation is described only briefly herein to the extent necessary to convey an understanding of embodiments of the invention.

In many applications, there exists a requirement to limit the bandwidth between the switching/routing nodes 18, 20, 22. For example, it may be necessary to apply a bandwidth limit of 10 Mbps on communications with the communication network 16. In a conventional wired communication system, this could be done at the switching/routing node 22 by applying rate limiting on ingress data or egress data of a port connecting to the communication network 16. Embodiments of the invention provide different techniques for limiting effective communication traffic rates on wireless links.

With advanced networking applications, the communication network 16 may include many users with different levels of service, or a user running different applications requiring different levels of service. The communication network 16 might service three levels of customers, such as "gold", "silver", and "bronze" for instance, with "gold" customers having a highest priority of service over "silver" and "bronze".

When bandwidth is limited to 10 Mbps for the communication network 16 at the switching/routing node 22 as noted above, there might be a requirement to provide a guaranteed level of bandwidth to "gold" customers. Similarly, when the communication network 16 includes a single customer running different applications such as voice, video, and data, it may be necessary to guarantee bandwidth to voice traffic all the time.

In both of these cases, the switching/routing node 22 must apply advanced traffic management and rate limiting functions.

Figure 2:
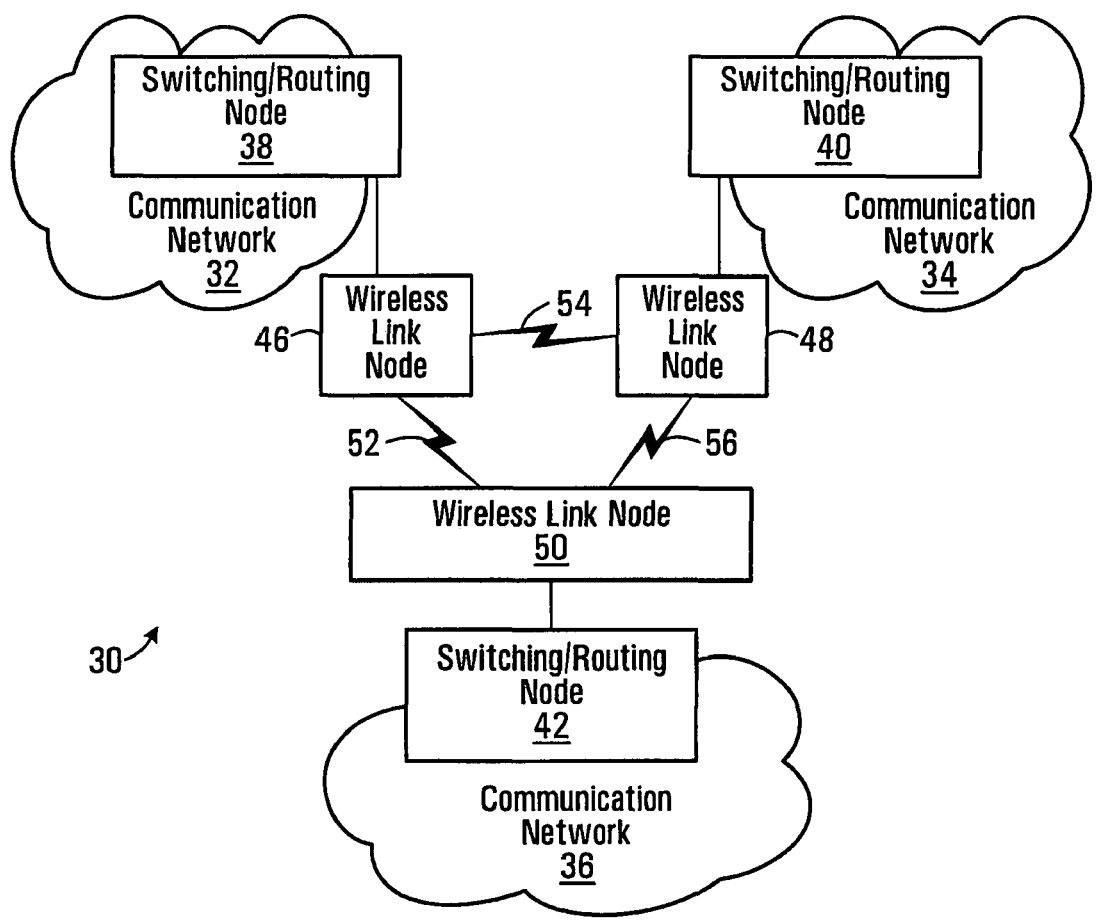
FIG. 2 is a block diagram of a communication system incorporating wireless communication links.

For wireless ring/mesh network configurations, one or more of the wired links 24, 26, 28 in the system 10 is replaced with a corresponding wireless link. FIG. 2 is a block diagram of a communication system that incorporates wireless links. In the system 30, switching/routing nodes 38, 40, 42 in communication networks 32, 34, 36 are operatively coupled to respective wireless link nodes 46, 48, 50. The wireless link nodes 46, 48, 50 enable the switching/routing nodes 38, 40, 42, and thus the communication networks 32, 34, 36, to communicate over wireless communication links 52, 54, 56.

Bandwidth limiting in the system 30 could be performed by the wireless link nodes 46, 48, 50 instead of by the switching/routing nodes 38, 40, 42. Although replacing wired connections with such "intelligent" wireless links may eliminate the requirement of having the switching/routing nodes 38, 40, 42 or at least some advanced functionality at those nodes, wireless links are different from wired connections in that two ends of a wireless link operate independently. There may also be different layers of connectivity between two wireless link nodes, including a radio or wireless transceiver for communicating through the wireless link, and an intermediate data path for processing communication signals for transfer between the wireless link and one of the communication networks 32, 34, 36.

The substantially independent operation of wireless link nodes that provide a wireless link presents a challenge in terms of rate control. For example, when bandwidth limiting is requested at one end of a wireless link, illustratively at the wireless link node 50 for the wireless link 52, the requested bandwidth limit should be conveyed to the wireless link node 46 at the other end of the link so that bandwidth is limited at both ends synchronously. In the case of a cascaded wireless link that includes multiple constituent sub-links between multiple wireless link nodes, rate control could be configured at any of those wireless link nodes and communicated to the other wireless link nodes. Rate control might be configured at a node at one end of a cascaded link, for example, and rate control information could then be passed from node to node along each sub-link so as to establish rate control for the entire cascaded link.

Some current rate limiting techniques change the signalling characteristics of wireless communication signals that are transferred over the air, and may result in user traffic downtime during rate changes while radio-level configurations are updated. In addition, as noted above, dynamic changes in wireless signal characteristics might not be allowed by regulatory requirements or by communication protocols or specifications, and may also result in changes in wireless link availability.

According to embodiments of the invention, communication rate control techniques are applied at wireless link nodes such as 46, 48, 50, while avoiding the shortcomings of currently known bandwidth or rate limiting techniques. The wireless link nodes 46, 48, 50 provide fixed wireless communication links 52, 54, 56 for which effective traffic rates are controlled without affecting wireless signalling characteristics.

Figure 3:
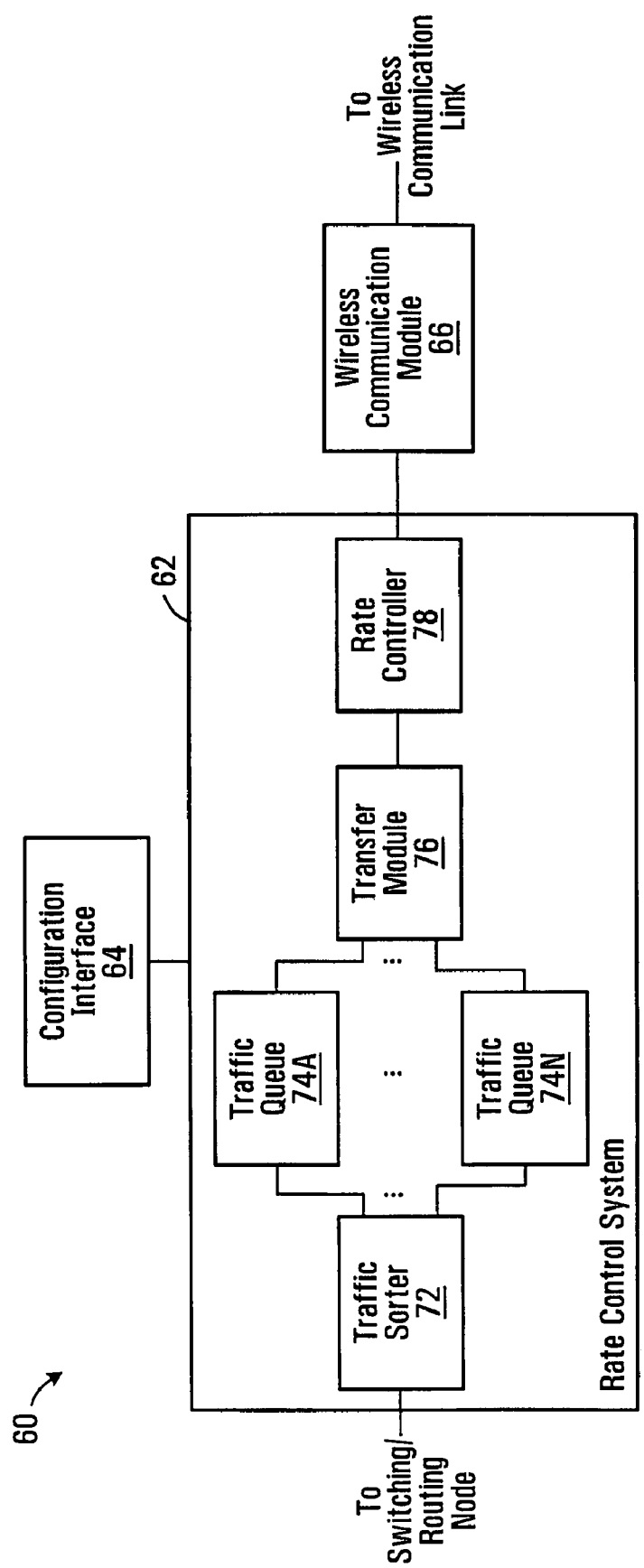
FIG. 3 is a block diagram of an apparatus according to an embodiment of the invention.

FIG. 3 is a block diagram of an apparatus according to an embodiment of the invention. The apparatus 60 includes a rate control system 62, a configuration interface 64 operatively coupled to the rate control system 62, and a wireless communication module 66 operatively coupled to the rate control system 62.

In the rate control system 62, a traffic sorter 72 is operatively coupled to a plurality of traffic queues 74A through 74N, which are operatively coupled to a transfer module 76. The transfer module 76 is operatively coupled to a rate controller 78.

It should be appreciated that a network element or other communication equipment or device in which the apparatus 60 is implemented may include other components than those explicitly shown in FIG. 3. For example, as will become apparent, the rate control system 62 controls a rate of a communication traffic stream that is output to the wireless communication module 66, which generates communication signals for transfer over a wireless communication link. The wireless communication module 66 may also in some embodiments receive communication signals from the wireless communication link and provide communication traffic in those received signals to other components (not shown) for processing.

Figure 4:
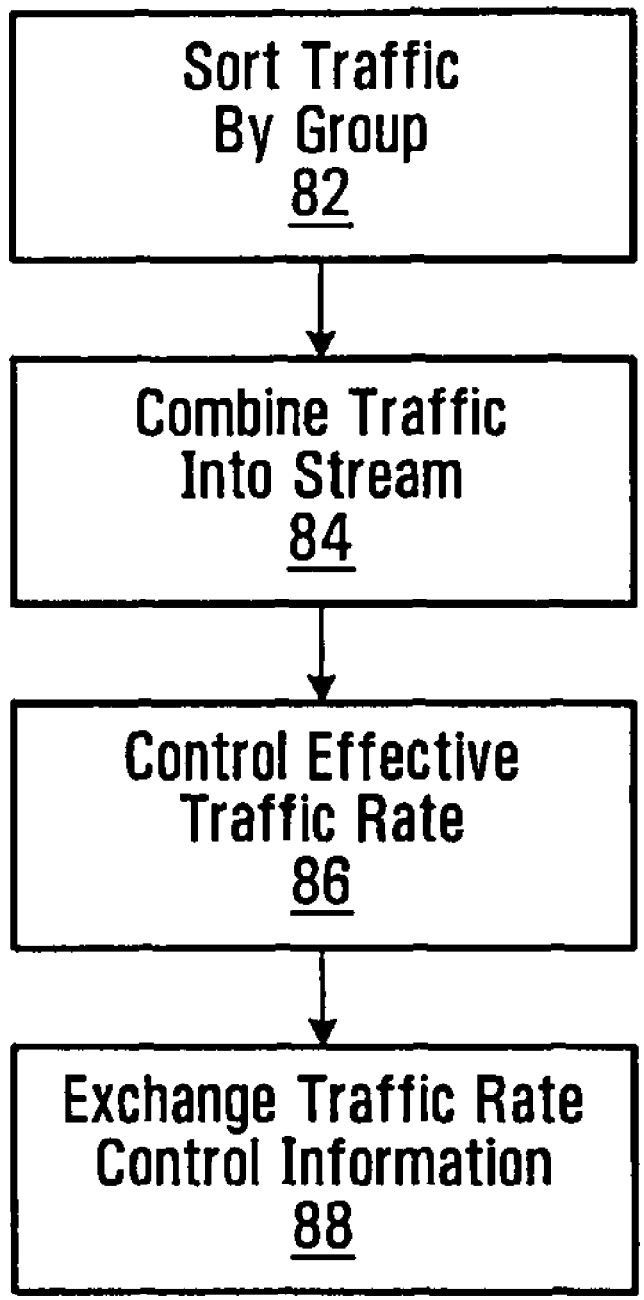
FIG. 4 is a flow diagram of a method according to another embodiment of the invention.

Thus, the contents of FIG. 3, as well as FIG. 4, are intended solely for illustrative purposes and not to limit the scope of the present invention. Other embodiments of the invention may include further, fewer, or different elements operatively coupled in a similar or different manner than explicitly shown. In some embodiments, for example, it may be possible to enable or disable components such as the traffic sorter 72 through configuration of a rate control system.

The various components of the rate control system 62 may be implemented using hardware, software for execution by one or more processing elements, firmware, or some combination thereof. The operative couplings between these components therefore need not necessarily be direct physical connections. Software components might access the same memory locations, for example, and thereby be operatively coupled through a logical connection.

Given the many possible implementations of the components of the rate control system 62, these components are described below primarily in terms of their respective functions. Based on these functional descriptions, a person skilled in the art would be enabled to implement embodiments of the invention in any of many different ways.

The configuration interface 64 may also be implemented using hardware, software, firmware, or some combination thereof. The specific structure and operation of the configuration interface 64 is at least to some extent implementation-dependent. In one possible implementation of the apparatus 60, the apparatus is incorporated into each wireless link node 46, 48, 50 (FIG. 2) at which rate control for a wireless communication link is to be applied. In the case of the wireless link node 50, multiple instances of the apparatus 60 may be provided for respectively controlling rates on the wireless links 52, 56. For node-based implementations of the apparatus 60, the configuration interface 64 may include an interface to a Network Management System (NMS), such as a Command Line Interface (CLI), through which an operator may enter control information.

An authentication procedure or other protection mechanism may be implemented in the configuration interface 64 to control access to the rate control system 62. Access controls may be used to prohibit unauthorized attempts to change a current allowed bandwidth or a maximum allowed bandwidth for a particular wireless communication link, for instance.

As described in further detail below, the configuration interface 64 may also or instead support the exchange of control information with a remote apparatus with which the apparatus 60 communicates through a wireless communication link. This type of exchange could be supported, for example, through dedicated control channels between communication equipment, in-band signalling on a wireless communication link, or some other mechanism. Where in-band signalling is supported, the configuration interface 64 may be operatively coupled to the wireless communication module 66.

The wireless communication module 66 is another component that may be implementation-dependent. In one embodiment, the wireless communication module 66 includes such transmitter elements as an encoder, a modulator, an amplifier, and one or more antennas in a transmit signal path. Components for performing corresponding inverse functions could also be provided in a receive signal path. Embodiments of the invention may thus be implemented in conjunction with a transmitter only, with separate transmitter and receiver modules, or with a transceiver that supports both transmit and receive functions.

In operation, the traffic sorter 72 receives communication traffic and determines to which one of multiple traffic groups the received communication traffic belongs. Traffic is received from a switching/routing node in the example shown in FIG. 3. It should be appreciated, however, that the present invention is in no way limited to this arrangement, and that communication traffic could be received from any of various types of systems or devices in other embodiments.

The groups into which incoming communication traffic is sorted by the traffic sorter 72 may be configurable through the configuration interface 64. The number of groups, respective traffic inclusion criteria for each group, and possibly other parameters may be provided to the rate control system 62 to initially configure or change the traffic sorting mechanism applied by the traffic sorter 72. Initially configuring and changing configuration of the rate control system 62 or any of its components are referred to collectively herein as establishing rate control. References to establishing traffic groups, a transfer scheme, and other rate control parameters, should be interpreted accordingly.

Communication traffic may be sorted based on any of various characteristics, including but not limited to a type of traffic (e.g., voice, data, or control), priority, class, source, destination, etc. In general, the traffic sorter 72 sorts blocks of traffic, which may be packets, cells, or some other form of traffic unit. In the case of packets, for example, the traffic sorter 72 may access information in the header of each packet to determine to which group the packet belongs.

The traffic queues 74A through 74N represent one example of an arrangement through which the traffic groups can be managed. Each of the traffic queues 74A through 74N may correspond to one traffic group. The length of each of the traffic queues 74A through 74N may be configurable through the configuration interface 64, although in some embodiments different queue lengths are implemented by assigning multiple fixed-length queues to a single traffic group. Once received communication traffic has been classified, the traffic sorter 72 determines to which one of the traffic queues 74A through 74N traffic of the determined group should be stored, and stores the traffic to that queue. Group to queue mapping may be determined by accessing a lookup table in memory (not shown), for example.

The transfer module 76 combines the communication traffic from the traffic queues 74A through 74N into a communication traffic stream in accordance with a transfer scheme that is based on the traffic groups. The transfer scheme may thus provide service level differentiation between traffic groups. More communication traffic might be included in the communication traffic stream from a higher service level queue than for a lower service level queue over a certain period of time, for instance.

A transfer scheme may specify respective transfer rates at which communication traffic of the traffic groups may be combined into the communication traffic stream. These rates may be in the form of a committed transfer rate at which received communication traffic of a traffic group is to be combined into the communication traffic stream when the corresponding traffic queue for that traffic group contains traffic, or a maximum transfer rate up to which received communication traffic of a traffic group can be combined into the communication traffic stream, for example. Different types of rates may be specified for different traffic groups in some embodiments. It is also contemplated that a single traffic group could have both a committed transfer rate and a maximum transfer rate.

Those skilled in the art will be familiar with many types of transfer schemes that may be used to combine traffic from the traffic queues 74A through 74N into a single traffic stream. Weighted Fair Queuing (WFQ) is one example of such a scheme, although the present invention is in no way limited to this or any other particular transfer scheme.

In some embodiments, the transfer scheme used by the transfer module 76 is also configurable, to allow the manner in which the groups of traffic are handled relative to each other to be initially configured and/or subsequently modified.

The rate controller 78 controls a rate of the communication traffic stream that is output from the transfer module 76, to thereby control the amount of communication traffic that is output to the wireless communication module 66. In accordance with an embodiment of the invention, the wireless communication module 66 generates communication signals that include communication traffic in the traffic stream it receives from the rate controller 78. These communication signals are generated based on fixed signalling characteristics for output to a wireless communication link. Thus, the rate controller 78 controls an effective communication traffic rate on the wireless communication link by controlling a rate of the communication traffic stream.

Where the effective rate is to be lowered, for example, the rate controller 78 reduces the rate at which communication traffic in the communication traffic stream is output to the wireless communication module 66, and accordingly less communication traffic is incorporated into the communication signals that are generated by the wireless communication module. Changes in the effective communication traffic rate on the wireless communication link can therefore be made "one the fly", and do not require any changes in signalling characteristics or configurations of the wireless communication module 66.

Rate control is thereby provided without requiring changes to signalling characteristics, which can remain fixed for different effective communication traffic rates. It should be noted, however, that this does not necessarily preclude signalling characteristic changes for different purposes than rate control. Signalling characteristics are also not "fixed" in the sense of being restricted to the same signalling characteristics for all embodiments of the invention. Different types of wireless communication links, for example, may involve different signalling characteristics. References herein to fixed signalling characteristics and fixed wireless communication links should be interpreted accordingly.

In general, the rate control controller 78 changes a rate of a communication traffic stream output by the transfer module 76 if an input rate at which it receives the stream differs from a target effective communication traffic rate. This may involve increasing the rate of the stream or decreasing the rate of the stream. In one embodiment, traffic stream rate changes are accomplished through a feedback mechanism, illustratively backpressuring, between the rate controller 78 and the transfer module 76. Feedback signals may be used to change a transfer mechanism used by the transfer module 76 to combine received communication traffic from the traffic queues 74A through 74N into the communication traffic stream.

Suppose that the traffic sorter 72 sorts received communication traffic into "gold" and "silver" service groups, with "gold" customers having a guaranteed bandwidth of 5 Mbps. As long as an effective rate of higher than 5 Mbps has been configured at the rate controller 78, traffic from both service groups will be combined into the communication traffic stream by the transfer module 76. If the effective rate is subsequently to be limited to 5 Mbps, however, then the rate controller 78 backpressures or otherwise signals the transfer module 76 to reduce the rate of the communication traffic stream to 5 Mbps. In this case, the "gold" service group traffic would take precedence, and "silver" traffic, if any, would gradually build up in its associated traffic queue(s) and possibly eventually be dropped unless or until some of the 5 Mbps bandwidth is not used by "gold" traffic or the effective rate on the wireless communication link is increased.

In order to provide for bandwidth control flexibility, the rate controller 78 may be configurable. The effective rate for a wireless communication link might be specified in communication traffic rate control information that is provided to the rate controller 78 through the configuration interface 64, for example.

As an extension of the configurability feature, some embodiments of the invention enable the rate control system 62, or specific configurable components thereof, to exchange communication traffic rate control information with a remote apparatus. For example, the apparatus 60 at one end of a wireless communication link might exchange control information with a similar apparatus at a far end of the link to establish the same effective traffic rate for the link. The effective rate of communication traffic is then controlled in the same way at each end of the link, to thereby provide rate control for communication traffic transfer in opposite directions on the link. Traffic groups, queues, and/or the transfer scheme applied by the transfer module 76 may be established in a similar manner by exchanging control information.

In the apparatus 60, this exchange of communication traffic control information is enabled by the configuration interface 64. Any or all of the traffic sorter 72, the transfer module 76, and the rate controller 78 may thus be operatively coupled to the configuration interface 64. According to another possible implementation, each configurable component itself supports a messaging mechanism or some other control information exchange interface. As noted above, communication traffic rate control information may be transferred as in-band signalling over the wireless communication link, and accordingly the wireless communication module 66 may transmit and/or receive control information in some embodiments.

It is important to note that the rate control system 62 or the configurable components thereof may establish rate control based on communication traffic rate control information and then transmit the communication traffic rate control information to a far end of a wireless communication link, and/or receive communication traffic rate control information and then establish rate control based on the received communication rate traffic control information. In some embodiments, communication traffic rate control information is negotiated, in which case communication traffic rate control information is both transmitted and received by the apparatus 60. Identical rate control is established at each end of the wireless communication link after rate control parameters are agreed upon.

Thus, a pair of communication network elements such as the wireless link nodes 46, 48, 50 (FIG. 2) that are operatively coupled together via a communication link, may incorporate respective instances of the apparatus 60. Communication traffic rate control information is exchanged between the network elements, and the rate control systems 62 provided at the network elements are configured accordingly.

FIG. 4 is a flow diagram of a method according to another embodiment of the invention. The method 80 involves sorting communication traffic by group at 82, by determining to which one of multiple traffic groups received communication traffic belongs. The received communication traffic is combined into a communication traffic stream at 84 in accordance with a transfer scheme that is based on the traffic groups. At 86, an effective traffic rate on a wireless communication link is controlled by controlling a rate of the communication traffic stream.

A further operation of exchanging communication traffic rate control information is shown in FIG. 4 at 88. As noted above, this operation might be performed in a different order than shown, where a rate control system is configured based on received control information, for instance.

Further variations of the method 80 are also possible. For example, other embodiments of the invention may involve performing the illustrated operations in any of various ways, and/or performing fewer or additional operations in a similar or different order than explicitly shown. Such variations may be or become apparent to those skilled in the art based on the above description of the apparatus 60 (FIG. 3), for instance.

What has been described is merely illustrative of the application of principles of embodiments of the invention. Other arrangements and methods can be implemented by those skilled in the art without departing from the scope of the present invention.

For example, the specific division of functions shown in FIG. 3 is intended solely for the purposes of illustration, and not to limit the scope of the invention. Other embodiments of the invention may be implemented using further or fewer components than shown, interconnected in a similar or different order.

It should also be appreciated that bandwidth, effective traffic rate, and effective data rate are used herein to generally refer to a rate at which actual user traffic, including any or all of voice, data, multimedia, etc., is transferred across a wireless communication link. References to bandwidth, effective traffic rate, and effective data rate should be interpreted accordingly.

In addition, although described primarily in the context of methods and systems, other implementations of the invention are also contemplated, as instructions stored on a computer-readable medium, for example.

We claim:

1. An apparatus comprising:
   a communication module to receive a stream of communication traffic, and to generate, based on fixed wireless signaling characteristics, communication signals comprising the communication traffic in the stream for output to a wireless communication link, the fixed wireless signaling characteristics providing a fixed communication signal rate on the wireless communication link; and
   a rate control system operatively coupled to the communication module, to output the communication traffic stream to the communication module and to control an effective communication traffic rate of the wireless communication link by controlling an amount of the communication traffic that is incorporated into the communication signals through control of a rate of the communication traffic stream,
   wherein the rate control system comprises: a communication traffic sorter to determine to which traffic group of a plurality of traffic groups received communication traffic belongs; a communication traffic transfer module, operatively coupled to the communication traffic sorter, to combine the received communication traffic into the communication traffic stream in accordance with a transfer scheme that is based on the plurality of traffic groups; and a rate controller, operatively coupled to the communication traffic transfer module, to control the rate of the communication traffic stream by controlling the transfer scheme,
   wherein the transfer scheme specifies respective transfer rates at which communication traffic of the plurality of traffic groups may be combined into the communication traffic stream,
   wherein the respective transfer rates comprise a committed transfer rate at which received communication traffic of a traffic group is to be combined into the communication traffic stream, a maximum transfer rate up to which received communication traffic of a traffic group is to be combined into the communication traffic stream, or both a committed transfer rate and a maximum transfer rate.

2. The apparatus of claim 1, wherein the rate control system is configurable using communication traffic rate control information.

3. The apparatus of claim 2, wherein the rate control system exchanges communication traffic rate control information with a further apparatus that is operatively coupled to the wireless communication link.

4. The apparatus of claim 3, wherein the communication module enables exchange of communication rate control information with the wireless communication link, and wherein the rate control system exchanges communication traffic rate control information with the further apparatus through the communication module and the wireless communication link.

5. The apparatus of claim 1, wherein the rate control system further comprises:
   a plurality of traffic queues operatively coupled between the communication traffic sorter and the communication traffic transfer module, each traffic queue of the plurality of traffic queues being for storing communication traffic of a respective traffic group of the plurality of communication traffic groups,
   wherein the communication traffic sorter stores received communication traffic determined to belong to a traffic group of the plurality of traffic groups to the queue for the determined traffic group.

6. The apparatus of claim 1, wherein the rate control system is implemented in software for execution by a processing element.

7. An apparatus comprising:
   an interface for enabling communication traffic rate control information to be exchanged with a remote apparatus that is operatively coupled to a wireless communication link; and
   a communication traffic rate control system, operatively coupled to the interface, to exchange communication traffic rate control information with the remote apparatus through the interface and to control an effective communication traffic rate of the wireless communication link by controlling, based on the exchanged communication traffic rate control information, an amount of communication traffic that is incorporated into communication signals that are generated using fixed wireless signaling characteristics and transferred over the wireless communication link, the fixed wireless signaling characteristics providing a fixed communication signal rate on the wireless communication link,
   at least one of the interface and the communication traffic rate control system being implemented using hardware,
   wherein the communication traffic rate control system exchanges communication traffic rate control information with the remote apparatus by transmitting communication traffic rate control information to the remote apparatus and receiving communication traffic rate control information from the remote apparatus through the interface, to thereby negotiate communication traffic rate control information based upon which the amount of communication traffic that is incorporated into the communication signals and transferred over the wireless communication link is controlled.

8. A communication system comprising:
   a pair of communication network elements operatively coupled together via a communication link, each of the communication network elements comprising an apparatus of claim 7, the communication traffic rate control systems at the network elements exchanging communication traffic rate control information and establishing the same effective communication traffic rate for communication signals to be transferred in opposite directions on the wireless communication link.

9. A method comprising:
   exchanging communication traffic rate control information between a communication traffic rate control system and a remote communication traffic rate control system that are operatively coupled to a wireless communication link; and
   controlling an effective communication traffic rate of the wireless communication link by controlling, based on the communication traffic rate control information, an amount of communication traffic that is incorporated into communication signals that are generated using fixed wireless signaling characteristics and transferred over the wireless communication link, the fixed wireless signaling characteristics providing a fixed communication signal rate on the wireless communication link, wherein exchanging comprises negotiating communication traffic rate control information based upon which the amount of communication traffic that is incorporated into the communication signals and transferred over the wireless communication link is controlled, by transmitting communication traffic rate control information to the remote communication traffic rate control system and receiving communication traffic rate control information from the remote communication traffic rate control system.

10. A method comprising:

receiving a stream of communication traffic;

generating, based on fixed wireless signaling characteristics, communication signals comprising the communication traffic in the stream for output to a wireless communication link, the fixed wireless signaling characteristics providing a fixed communication signal rate on the wireless communication link; and controlling an effective communication traffic rate of the wireless communication link by controlling an amount of the communication traffic that is incorporated into the communication signals through control of a rate of the communication traffic stream, the controlling comprising: determining to which traffic group of a plurality of traffic groups received communication traffic belongs; combining the received communication traffic into the communication traffic stream in accordance with a transfer scheme that is based on the plurality of traffic groups; and controlling the rate of the communication traffic stream by controlling the transfer scheme, wherein the transfer scheme specifies respective transfer rates at which communication traffic of the plurality of traffic groups may be combined into the communication traffic stream, wherein the respective transfer rates comprise a committed transfer rate at which received communication traffic of a traffic group is to be combined into the communication traffic stream, a maximum transfer rate up to which received communication traffic of a traffic group is to be combined into the communication traffic stream, or both a committed transfer rate and a maximum transfer rate.

* * * * *

UNITED STATES PATENT AND TRADEMARK OFFICE
CERTIFICATE OF CORRECTION

PATENT NO. : 7,957,291 B2  
APPLICATION NO. : 11/783091  
DATED : June 7, 2011  
INVENTOR(S) : Erik Boch et al.

Page 1 of 1

It is certified that error appears in the above-identified patent and that said Letters Patent is hereby corrected as shown below:

On the Title page of the letters patent, "(73) Assignee: Canada Inc., Ottawa, Ontario (CA)", should be --(73) Assignee: 4472314 Canada Inc., Ottawa, Ontario (CA)--

Signed and Sealed this
Eighteenth Day of October, 2011

David J. Kappos
*Director of the United States Patent and Trademark Office*